(12) United States Patent
Valentin et al.

(10) Patent No.: US 8,411,348 B2
(45) Date of Patent: Apr. 2, 2013

(54) HIGHLY ELECTRICALLY CONDUCTIVE TRANSPARENT LAYER WITH A METAL GRID HAVING OPTIMIZED ELECTROCHEMICAL RESISTANCE

(75) Inventors: Emmanuel Valentin, Le Plessis Trevise (FR); Samuel Dubrenat, Paris (FR); Didier Jousse, Taverny (FR); Jean-Christophe Giron, Eupen (BG); Philippe Letocart, Raeren (BG); Se-Jong Kim, Compiegne (FR); Emilie Steers, Saint-Denis (FR)

(73) Assignee: Saint-Gobain Glass France, Courbevoie (FR)

( * ) Notice: Subject to any disclaimer, the term of this patent is extended or adjusted under 35 U.S.C. 154(b) by 737 days.

(21) Appl. No.: 12/513,178

(22) PCT Filed: Oct. 22, 2007

(86) PCT No.: PCT/FR2007/052226
§ 371 (c)(1),
(2), (4) Date: Dec. 31, 2009

(87) PCT Pub. No.: WO2008/053109
PCT Pub. Date: May 8, 2008

(65) Prior Publication Data
US 2010/0132988 A1 Jun. 3, 2010

(30) Foreign Application Priority Data

Nov. 3, 2006 (FR) ...................................... 06 54708
Apr. 5, 2007 (FR) ...................................... 07 54333

(51) Int. Cl.
*G02F 1/155* (2006.01)
*G02F 1/153* (2006.01)

(52) U.S. Cl. ........ 359/266; 359/265; 359/268; 359/269; 359/272; 359/273; 359/274

(58) Field of Classification Search ........... 359/265–275
See application file for complete search history.

(56) References Cited

U.S. PATENT DOCUMENTS

| | | | | |
|---|---|---|---|---|
| 5,124,832 A | * | 6/1992 | Greenberg et al. | 359/269 |
| 5,161,048 A | * | 11/1992 | Rukavina | 359/275 |
| 5,293,546 A | * | 3/1994 | Tadros et al. | 359/269 |
| 5,923,456 A | * | 7/1999 | Tench et al. | 359/266 |
| 5,985,486 A | * | 11/1999 | Giron | 429/188 |
| 6,166,847 A | | 12/2000 | Tench et al. | |
| 6,195,193 B1 | * | 2/2001 | Anderson et al. | 359/265 |
| 6,317,248 B1 | * | 11/2001 | Agrawal et al. | 359/265 |
| 7,502,156 B2 | * | 3/2009 | Tonar et al. | 359/267 |
| 2002/0085157 A1 | | 7/2002 | Tanaka et al. | |
| 2003/0048519 A1 | | 3/2003 | Kozicki | |
| 2006/0033978 A1 | | 2/2006 | Morin et al. | |

FOREIGN PATENT DOCUMENTS

| | | |
|---|---|---|
| JP | 2002 082360 | 3/2002 |
| WO | 92 18896 | 10/1992 |
| WO | 99 32929 | 7/1999 |

\* cited by examiner

*Primary Examiner* — Evelyn A. Lester
(74) *Attorney, Agent, or Firm* — Oblon, Spivak, McClelland, Maier & Neustadt, L.L.P.

(57) ABSTRACT

An electroconductive layer (2) designed to be combined with a substrate having a glass function, said layer (2) being composed of a metal grid (9), characterized in that the metal grid (9) consists of a pure metal and in that it is coated with at least one electrochemical protection layer (10), especially a metal layer or a metal nitride layer.

15 Claims, 3 Drawing Sheets

HIGHLY ELECTRICALLY CONDUCTIVE TRANSPARENT LAYER WITH A METAL GRID HAVING OPTIMIZED ELECTROCHEMICAL RESISTANCE

The present application is the U.S. counterpart of WO 2008/053109, the text of which is incorporated by reference and claims the priority of the two priorities of the French application No. 0654708 filed on Nov. 3, 2006 and No. 0754333 filed on Apr. 5, 2007, the text of which is incorporated by reference.

The subject of the present invention is an electroconductive layer for an electrochemical and/or electrically controllable device of the glazing type and having variable optical and/or energy properties, or a photovoltaic device or else an electroluminescent device. The invention relates more particularly to a highly electrically conductive transparent layer with a metal grid having optimized electrochemical resistance, suitable for undergoing a heat treatment of the bending or toughening type.

At the present time there is in fact an increasing demand for so-called "smart" glazing capable of meeting the requirements of users.

There is also an increasing demand for photovoltaic glazing, which makes it possible to convert solar energy into electrical energy, and for electroluminescent glazing, which has useful applications in devices and as illuminating surfaces.

As regards "smart" glazing, this makes it possible to control the solar heat influx through glazing panels fitted on the outside of buildings, or vehicles of the car, train or plane type. The object is to be able to limit excessive heating inside passenger compartments/rooms, but only should there be strong sunlight.

This also relates to mirrors used as rear-view mirrors, to prevent a driver from being dazzled, or indicating panels, so that messages appear when this is necessary, or intermittently in order to draw one's attention better. Glazing panels that may be made diffusing at will may be used when desired, such as for projection screens.

This may also control the degree of vision through glazing panels, especially in order to darken them, or to make them diffusing or even to prevent any vision when this is desirable. This may relate to glazing panels fitted into internal partitions in rooms, trains or aircraft, or fitted as side windows in motor vehicles, or more particularly still, when these glazing panels are mounted on the front face of a flat screen, for example of the LCD or plasma type. In this specific use of flat screens, the front face element, generally a glass substrate, predominantly determines the attractiveness of the screen.

This is because it is necessary that, in the off-state, these screens have a black front face and that, in the lit state, this black front face disappears as rapidly as possible in order to reveal the image.

At the present time, manufacturers of screens of this type mount, as front face, a substrate having a light transmission $T_L$ of around 50%. Now, it will be readily understood that in the lit state this reduction in $T_L$ remains and impairs the quality of the image.

The inventors had the idea of proposing to substitute this front face with a reduced $T_L$ by a transparent substrate provided with an electrically controllable system allowing such changes in esthetic appearance to be made.

To modulate the light transmission or the light absorption of glazing, there are viologen systems such as those disclosed in the U.S. Pat. No. 5,239,406 and EP-612 826.

To modulate the light transmission and/or the thermal transmission of glazing panels, there are also electrochromic systems. As is known, these generally comprise two layers of electrochromic material which are separated by an electrolyte layer and flanked by two electroconductive layers. Each of the layers of electrochromic material can reversibly insert cations and electrons, the change in their degree of oxidation following such injections/ejections resulting in a change in its optical and/or thermal properties. In particular, it is possible to modulate their absorption and/or their reflection for wavelengths in the visible and/or in the infrared.

It is customary to put electrochromic systems into three categories:
 that in which the electrolyte is in the form of a polymer or a gel; for example, a protonically conductive polymer such as those disclosed in patents EP-253 713 or EP-670 346, or a polymer conducting by lithium ions, such as those disclosed in patents EP-382 623, EP-518 754 and EP-532 408; the other layers of the system generally being inorganic in nature;
 that in which the electrolyte is, as are all the other layers forming the system, an essentially inorganic layer. This category is often referred to as an "all solid" system—examples of this may be found in the patents EP-867 752 and EP-831 360 and the patents WO 00/57243 and WO 00/71777; and
 that in which all of the layers are based on polymers, this category being often referred to as an "all polymer" system.

There are also systems called "optical valves". These are films comprising a matrix of a generally crosslinked polymer, in which microdroplets containing particles are dispersed, which particles are capable of being oriented in a preferred direction under the action of a magnetic or electric field. Thus, the patent WO 93/09460 discloses an optical valve comprising a polyorganosilane matrix and polyiodide-type particles which intercept much less light when the film is under voltage.

Mention may also be made of liquid-crystal systems, operating in a similar mode to the previous ones. They are based on the use of a film placed between two conductive layers and based on a polymer in which liquid-crystal droplets are placed, especially nematic liquid crystals of positive dielectric anisotropy. When a voltage is applied to the film, the liquid crystals orient along a preferred axis, which permits vision. With no voltage applied, when the crystals are not aligned, the film becomes diffusing and prevents vision. Examples of such films are disclosed in particular in European patent EP-0 238 164 and U.S. Pat. Nos. 4,435,047, 4,806,922 and 4,732,456. This type of film, once it has been laminated and incorporated between two glass substrates, is sold by Saint-Gobain Vitrage under the brand name "Priva-Lite".

In fact, it is possible to use any of the liquid-crystal devices known by the term NCAP (Nematic Curvilinearly Aligned Phase) or the term PDLC (Polymer Dispersed Liquid Crystal).

It is also possible to use, for example, cholesteric liquid-crystal polymers such as those disclosed in the patent WO 92/19695.

As regards electroluminescent systems, these include a material or a stack of organic or inorganic electroluminescent materials supplied with electricity via electrodes.

All these confounded systems have in common the need to be equipped with current leads for supplying electrodes generally in the form of two electroconductive layers on either side of the active layer or of the various active layers of the system.

These electroconductive layers (which may in fact be a superposition of layers) commonly include a layer based on indium oxide, generally tin-doped indium oxide better known by the abbreviation ITO. There may also be layers based on doped tin oxide, for example antimony-doped tin oxide, or else layers based on doped zinc oxide, for example aluminum-doped zinc oxide (or a mixture based on at least two of these oxides).

ITO layers have been particularly studied. They can be easily deposited by magnetically enhanced cathode sputtering, either using an oxide target (nonreactive sputtering) or using a target based on indium and tin (reactive sputtering in the presence of an oxidizing agent of the oxygen type). However, to have sufficient electrical conductivity for the application and to be electrochemically robust, said layers require the use of a heat treatment step in situ or subsequently (often above 300° C.).

Nevertheless, although functionally very suitable as electroconductive layer within an electrically controllable system, ITO, even when annealed, has insufficient conductivity, resulting in a loss of charge phenomenon during changes in the state of the system (switching from a colored state to a bleached state). This is reflected in the specific case of an electrically controllable system of the electrochromic type by inhomogeneous switching and a switch speed that is reduced linearly with the area of the system. It will be understood that if an ITO-based electroconductive layer is used in an electrochromic system combined with a substrate having a glass function as front face element for a flat screen, the technical specifications of ITO are incompatible with this type of use (for example the speed of switching between the off-state and the on-state of the screen).

Another approach consists in inserting, into a stack of oxide layers, a metal layer for improving the surface resistance of the electroconductive layer, this metal layer being moreover sufficiently thin to retain a certain level of light transmission.

Within this context, document WO 93/05438 for example teaches an electroconductive layer consisting of a thin metal layer, especially based on silver, copper or aluminum, which is combined with a layer based on a metallic blocker, such as iron, zirconium, titanium or tungsten. This TCO (transparent conductive oxide) stack is intended to be integrated into an electrochromic-type electrochemical device within which the metallic blocker layer constitutes a barrier to the diffusion of $Li^+$ ions between one of the active layers and the metal layer.

Also taught, by document WO 94/15247, is an electroconductive layer having a structure similar to that described above, which is supplemented with a layer based on a transparent conductive oxide such as, for example, zinc oxide or tin-doped indium oxide.

Furthermore, documents U.S. Pat. Nos. 5,510,173 and 5,763,063 teach an energy-control stack structure incorporating a layer of silver or copper advantageously alloyed with a noble metal, for which corrosion protection is obtained by coating with a bilayer based on an oxide or a mixture of oxides, for example $In_2O_3$ and ITO, or $ZnO_2/In_2O_3$ and ITO. In the case of the use of $ZnO_2$, the application as electrode is impossible owing to the insulating character of this oxide.

Furthermore, U.S. Pat. No. 6,870,656 is known which describes a reflective electrode structure incorporating a layer based on an electrochemically stable silver-gold alloy.

Irrespective of the electroconductive layer structure described above, its electrochemical resistance is achieved only when this electroconductive layer is alloyed.

Another strategy for improving the electrochemical resistance of the metal layer consists in protecting the latter by combining two oxides, namely ZnO:Al and ITO (the reader may refer to patent application FR 2 886 419).

However, irrespective of the TCO structure, it is difficult to have a very low surface resistance and a rapid switching speed for the active systems without using a thick metal layer, which would appreciably degrade the light transmission.

A solution for improving the switching speed has been described in U.S. Pat. No. 5,293,546 by the use of a metal grid coated with an ITO-type oxide. However, in an application in the electrochromic field, the electrochemical resistance of the grid is manifestly insufficient.

The set objective of the invention is to achieve an electrochemically robust assembly of electroconductive layers that allows rapid switching times to be obtained so as to constitute the electrodes of electrochemical/electrically controllable systems of the type (electrochromic, photovoltaic, etc.) of those described above. Incidentally, this objective is to be achieved at a very low cost and avoiding heat treatment steps and without upsetting the known configurations of the electrochemical systems relating to the invention. More generally, this involves developing better electrodes on an essentially transparent substrate (made of glass or polymer material).

One subject of the invention is an electroconductive layer designed to be combined with a substrate having a glass function, said layer being composed of a metal grid, characterized in that the metal grid consists of a pure metal and in that it is coated with at least one electrochemical protection layer, especially a metal layer or a metal nitride layer.

Thanks to this particular grid structure, it is possible to obtain, for a lower cost, an electrode having an electrochemical resistance compatible with the electrically controllable systems while still having high electrical conductivity properties, thus guaranteeing extremely rapid switching times between a colored state and a bleached state of the electrically controllable system.

In preferred embodiments of the invention, one or more of the following arrangements may optionally be furthermore employed:

- the electrochemical protection layer is combined with at least one barrier layer based on a metal oxide;
- the metal oxide is chosen from zinc oxide, mixed zinc oxide doped with another metal chosen from the family of the following metals: Al, Ga, B, and Sc, doped, especially tin-doped, indium oxide and doped, especially antimony-doped tin oxide;
- the grid is based on a pure material chosen from silver, copper, zinc, aluminum, nickel, chromium and a nickel-chromium alloy;
- the electrochemical protection layer is based on a material chosen from titanium, gold, platinum and palladium, said material optionally being nitrided;
- the thickness of the grid is between 1 and 15 µm, more preferably between 2 and 8 µm and even more preferably about 3 µm;
- the thickness of the electrochemical protection layer is between 10 and 100 nm, more preferably between 25 and 75 nm and even more preferably about 50 nm;
- the thickness of the barrier layer is between 40 and 400 nm, more preferably between 60 and 300 nm and even more preferably about 250 nm;

the grid is deposited on a second barrier layer, especially based on silicon nitride;

the resistivity of the electroconductive layer is between 0.01 ohms/□ and 1 ohms/□, preferably between 0.2 and 0.6 ohms/□ and even more preferably about 0.4 ohms/□; and the electroconductive layer is suitable for undergoing a heat treatment of the bending or toughening type.

Within the context of the invention, the term "lower electrode" is understood to mean the electrode lying closest to the carrier substrate taken as reference, on which electrode at least some of the active layers (for example all of the active layers in an "all solid" electrochromic system) are deposited. The "upper electrode" lies above the stack of active layers relative to the same reference substrate.

Advantageously, the lower electrode incorporating the electroconductive layer according to the invention has an electrical resistivity of between 0.2 and 0.6 ohms/□ and a $T_L$ of 75 to 85%, thereby making its use as transparent electrode perfectly satisfactory.

Preferably, in particular to achieve this level of resistivity, the metal grid has a total thickness of between 1 and 3 μm.

Within these thickness ranges, the electrode remains transparent, that is to say it has a low light absorption in the visible, even in the presence of the grid (its network is practically invisible owing to its dimensions). The grid has a periodic or aperiodic structure representing a light occultation of 15 to 25%. For example, a square network having metal strands 20 μm in width spaced apart by 300 μm gives a substrate a light transmission of 80% compared with a light transmission of 92% when bare. Illustrative examples of these periodic or aperiodic structures are described in German application DE 10 2006 045 514.2.

As mentioned above, the invention may apply to various types of electrochemical or electrically controllable systems. It relates more particularly to electrochromic systems, especially "all solid" ones (the term "all solid" being defined, within the context of the invention, in respect of the multilayer stacks for which all the layers are of inorganic nature) or "all polymer" ones (the term "all polymer" being defined, within the context of the invention, in respect of multilayer stacks for which all the layers are of organic nature), or else for mixed or hybrid electrochromic systems (in which the layers of the stack are of organic nature and inorganic nature) or else liquid-crystal or viologen systems or else electroluminescent systems.

The electrochromic systems or glazing panels to which the invention may apply have been described in the aforementioned patents. They may comprise at least one carrier substrate and a stack of functional layers comprising at least, in succession, a first electroconductive layer as described above, an electrochemically active layer capable of reversibly inserting ions such as $H^+$, $Li^+$ and $OH^-$, of the respectively anodic and cathodic electrochromic material type, an electrolyte layer, a second electrochemically active layer capable of reversibly inserting ions such as $H^+$, $Li^+$ and $OH^-$, of the respectively cathodic and anodic electrochromic material type, and a second electroconductive layer (the term "layer" should be understood to mean a single layer or a superposition of several layers, whether these are continuous or discontinuous).

The invention also relates to the incorporation of the electrochemical devices described in the preamble of the present application in glazing, operating in transmission. The term "glazing" should be understood in the broad sense and encompasses any essentially transparent material made of glass and/or a polymer material (such as polycarbonate PC or polymethyl methacrylate PMMA). The carrier substrates and/or counter-substrates, that is to say the substrates flanking the active system, may be rigid, flexible or semiflexible.

The invention also relates to the various applications that may be found for these devices, namely as glazing or mirrors: they may be used for producing architectural glazing, especially exterior glazing, internal partitions or glazed doors. They may also be used for windows, roofs or internal partitions of means of transport, such as trains, airplanes, cars, boats and worksite vehicles. They may also be used for display screens, such as projection screens, television or computer screens and touch-sensitive screens. They may also be used for producing spectacles or camera lenses, or else for protecting solar panels. It is also possible to use them as energy storage devices of the battery type, fuel cell, and batteries and cells themselves.

The invention will now be described in greater detail by means of nonlimiting examples and figures:

FIG. 1: a schematic top view of an electrochromic cell using an electroconductive layer according to the invention;

FIGS. 1 and 2 are intentionally highly schematic and are not necessarily to scale in order to make it easier to examine them. They represent an "all solid" electrochromic device according to the teachings of the invention, comprising in succession:

Figure 1:
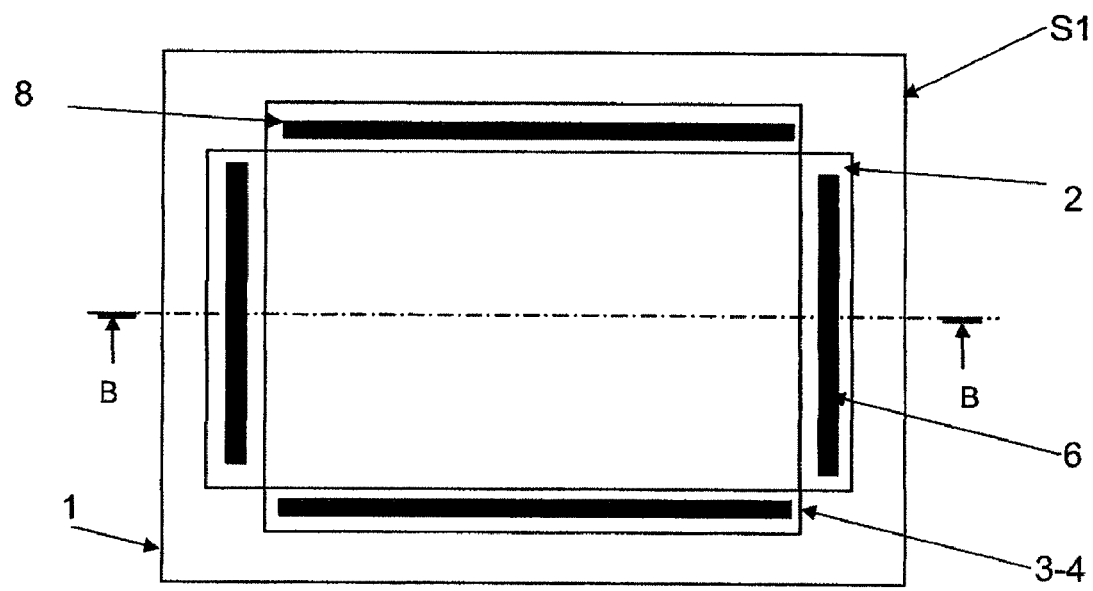
Figure 2:
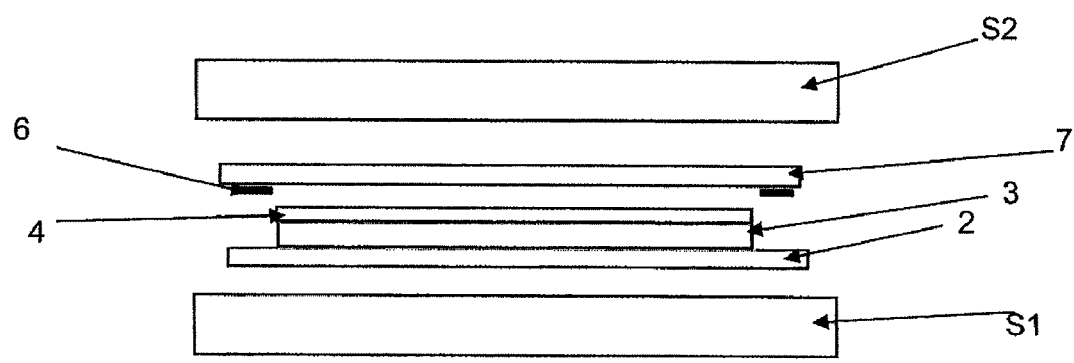
FIG. 2 is a sectional view of the entire stack, which includes an electroconductive layer according to the invention.
Figure 3:
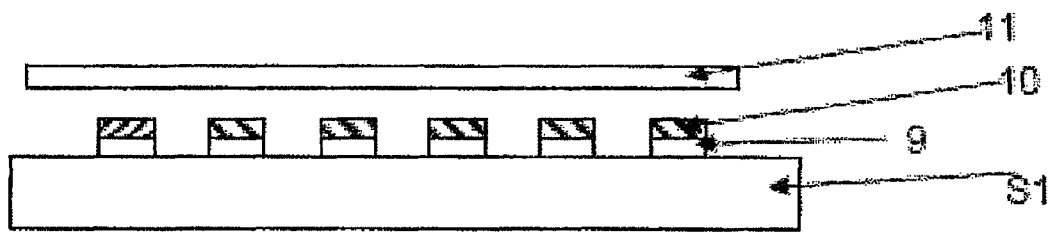
FIG. 3 is a sectional view, on a large scale, of the electroconductive layer according to the invention.

a clear soda-lime-silica glass substrate S1 with a thickness of 2.1 mm;

a lower electrode 2 comprising, on the one hand, a grid 9 (which can be seen in FIG. 3) made of aluminum in the form of a square network with strands 20 μm in width spaced apart by 300 μm and having a thickness of around 3 μm, this grid 9 being coated with an electrochemical protection layer 10 (which can be seen in FIG. 3) based on titanium nitride with a thickness of about 50 nm, combined with at least one barrier layer 11 (which can be seen in FIG. 3) comprising a multilayer stack of the ZnO:Al/ITO type with respective thicknesses of 60 nm for the ZnO:Al and 30 nm for the ITO;

an upper electrode 4 based on ITO or $SnO_2$:F;

an electrochromic system 3, the structure of which will be described below: and a PU sheet 7 allows the glass S1 to be laminated to another glass S2 of the same characteristics as the glass S1. Optionally, that face of the glass S2 turned toward the PU sheet 7 is provided with a stack of thin layers having a solar protection function. This stack may in particular comprise two silver layers interspersed in a known manner with dielectric layers. As a variant, the PU sheet 7 may be provided, on its face in contact with the active stack 3, with a grid 9 similar to that deposited on the substrate, as lower electrode 2. The electrodes 2 and 4 are connected to current leads 6 and 8.

The electrochromic system 3 comprises:

a first layer EC1 of anodic electrochromic material made of hydrated iridium oxide 40 to 100 nm in thickness or hydrated nickel oxide 40 to 400 nm in thickness, whether or not alloyed with other metals (as a variant, this layer may be replaced with a layer of anodic electrochromic material made of nickel oxide 100 to 300 nm in thickness, whether or not alloyed with other metals);

a tungsten oxide layer 100 nm in thickness;

a second layer made of hydrated tantalum oxide or hydrated silica oxide or hydrated zirconium oxide 100 nm in thickness, the latter two layers forming a layer EL with an electrolytic function; and a second layer EC2 of cathodic electrochromic material based on tungsten oxide $WO_3$ 370 nm in thickness.

All the layers were deposited by magnetically enhanced cathode sputtering.

The electrochromic device described above constitutes Example 1.

Given below is Example 2, which is a known structure of the prior art, for which both the lower and upper electrodes are based on ITO or $SnO_2$:F.

EXAMPLE 2

Comparative Example=Standard EC Example

The EC (electrochromic) glazing has the same composition as Example 1 except that:

the lower electrode 2 is based on ITO (tin-doped indium oxide) 500 nm in thickness, deposited hot (at 350° C.), and does not incorporate a grid.

As a variant, the upper electrode includes other conducting elements. More particularly, the electrode may be combined with a layer that is more conductive than it and/or with a plurality of conducting bands or wires. The reader may refer for further details to aforementioned patent WO 00/57243 for the implementation of such multicomponent electrodes. A preferred embodiment of this type of electrode consists in applying to the ITO layer (optionally surmounted by one or more other conducting layers) a network of conducting wires encrusted into the surface of a sheet of polymer (which will then protect the active system and/or allow the carrier substrate of the glass type to be laminated with another glass in the case of the manufacture of electroactive glazing, for example of the electrochromic type).

The aluminum grid 9 may be obtained for example by a photolithography technique or by a laser ablation technique, and given below in Table 1 are the $T_L$ (light transmission) and electrical conduction values obtained.

|  | Al thickness (μm) | $T_L$ (%) | $R_s$ (Ω/□) |
| --- | --- | --- | --- |
| Grid (laser) | 1 | 75-77 | 0.8-0.9 |
| Grid (laser) | 3 | 76-78 | 0.4-0.6 |
| Grid (litho) | 1 | 68-70 | 0.7-0.8 |
| Grid (litho) | 3 | 67-71 | 0.3-0.4 |

Comparative tests were carried out on the two electrochromic cells having dimensions of 30 cm×30 cm and summarized in Table 2 below:

TABLE 2

Switching speed measurements

|  | Example 2 | | Example 1 | |
| --- | --- | --- | --- | --- |
|  | Zone A | Zone B | Zone A | Zone B |
| $T_{L,bleach}$ (%) | 63.5 | 64.8 | 70 | 69.9 |
| $T_{L,color}$ (%) | 22.3 | 17.45 | 26 | 24 |
| Contrast | 2.85 | 3.71 | 2.69 | 2.91 |
| $V_{color}$ (s) | 13 | 9 | 3 | 3 |
| $V_{bleach}$ (s) | 8 | 5 | 3 | 3 |

Zone A: center;
Zone B: side;
$T_{L,bleach}$: light transmission in the bleached state;
$T_{L,color}$: light transmission in the colored state;
$V_{color}$: time to reach 90% coloring starting from the bleached state;
$V_{bleach}$: time to reach 90% bleaching starting from the colored state.

For constant contrast (about 3), the EC glazing of Example 1 (on the electrode with a metal grid) is characterized, compared with the EC glazing of Example 2, by:

more rapid switching (an increase in speed by a factor of 3 to 4 in coloring time and 1.6 to 2.6 in bleaching time);
uniform switching (the same switching time over the entire surface).

|  | Resistivity (Ω/□) | $V_{switch}$ (s) | Contrast |
| --- | --- | --- | --- |
| Example 2 (std. EC) | 5 | 13 | 3 |
| Example 1 | 0.5 | 3 | 3 |

According to another advantageous feature of the invention, it has been shown that the grid forming the subject of the invention is capable of undergoing heat treatments—in particular it withstands a bending or even a toughening operation.

After an aluminum layer about 3 μm in thickness has been deposited on a substrate having a glass function, for example using a magnetron sputtering process, this layer is coated with an electrochemical protection layer based on titanium nitride about 20 nm in thickness, for example also deposited by magnetron sputtering. As a variant, a barrier layer based on silicon nitride is interposed between the substrate having a glass function and the aluminum-based metal layer.

This stack is then etched by lithography or laser ablation techniques.

The grid thus formed on a first substrate is combined with a second substrate forming a counter-pane and in such a way as to be either on face 2 or on face 3 of the assembly formed by the superposition of the two substrates. The bending of the two superposed sheets is carried out by any suitable process, especially a gravity process on supports such as frameworks or frames, by pressing and/or by suction on frames or solid molds.

In the case of toughening, the grid thus formed is combined with a substrate that is toughened by any conventional toughening process.

The nature of the stack on which the grid was produced is particularly adapted so as to withstand oxidation (aluminum undergoing passivation), the titanium nitride forming a barrier to oxidation, the grid also being protected from oxygen by the lamination.

The resistivity measurements given below illustrate perfectly that the grid retains its electrical conductivity properties before and after bending or after toughening.

Thus, for example, a grid 3 μm in thickness, having a strand width of 40 μm and an inter-strand spacing of 300 μm, has a surface resistivity of 0.3Ω/☐ before heat treatment and a resistivity of 0.25Ω/☐ after bending or toughening.

The invention also relates to a substrate provided with at least one electrode of the type described above, independently of the electrical/electrochemical device into which it is incorporated or intended to be incorporated, and also the electrode as such.

According to other possible applications of said grid, the latter may be used as active layer in an electrochemical and/or electrically controllable device having variable optical and/or energy properties, or a photovoltaic device, or an electroluminescent device, or else a heating device or possibly a flat-lamp device, an electromagnetic shielding device, or any other device requiring a transparent conductive layer.

Figure 4:
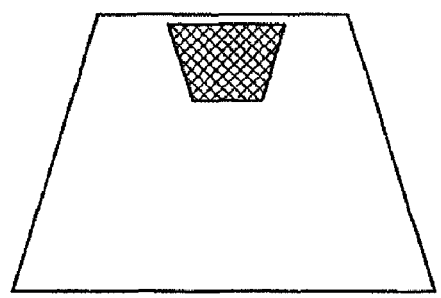
FIG. 4 is a schematic view of an alternative embodiment of the invention.

As heating device, this grid may be positioned within an opening made in the windshield through which a lens of a camera or of any other electronic apparatus points, this opening always being free of fogging owing to the heating device (cf. FIG. 4).

According to another embodiment, the grid may be deformed, stretched on its support, so as to have locally electrical (conductivity) properties that differ from the adjacent region.

Figure 6:
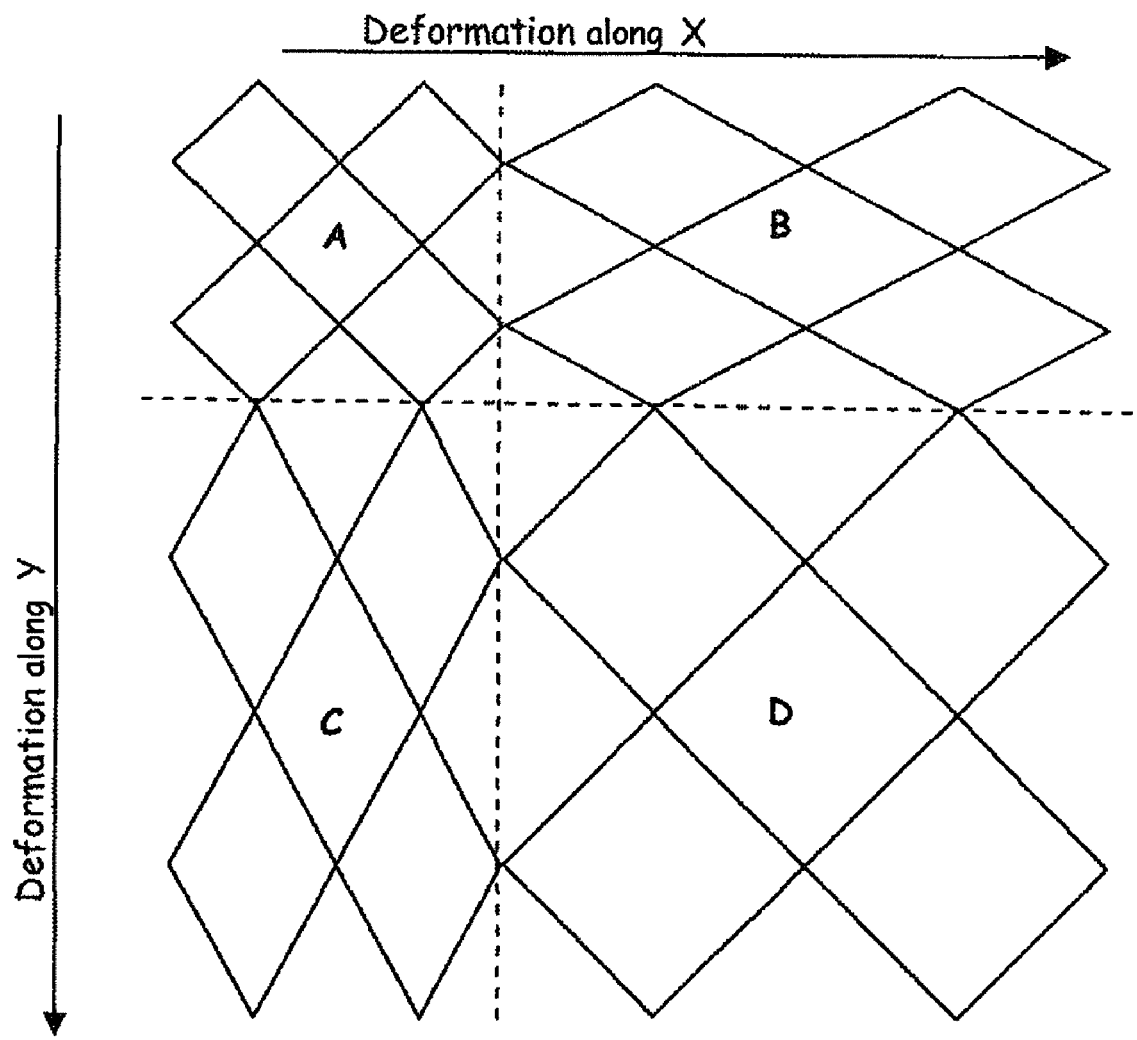
FIG. 6 is a schematic view of a stretched, deformed grid.

Depending on the preferential direction of the deformation, i.e. in the direction of stretching (two adjacent cells move further apart) or the direction of shrinkage (on the contrary, two adjacent cells move closer together), it is possible to induce, when a current flows in the grid, heating fronts along preferential directions. Thus, depending on the profile of the glazing (flat, curved, complex, etc.), it is possible to obtain either uniform heating and to compensate for shape factors, or on the contrary different heating zones depending on particular zones of the glazing, for example to promote heating along the edges rather than in the center (cf. FIG. 6).

Figure 5:
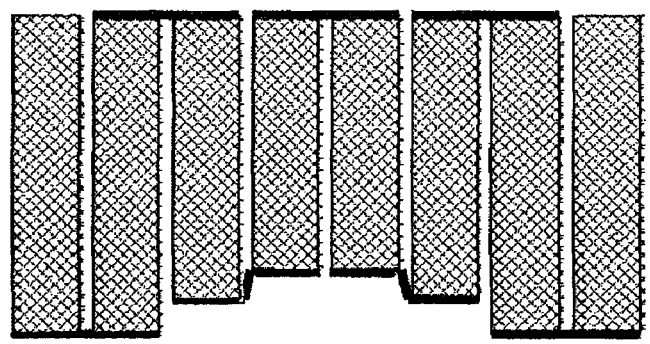
FIG. 5 illustrates one particular method of electrical connection of the invention.

Without departing from the scope of the invention, it is also possible to use several grids, each having their own characteristic (resistivity for example) by electrically connecting them using a busbar, either in series or in parallel (the reader may refer to FIG. 5).

The invention claimed is:

1. An electrochemical/electrically controllable device having variable optical and/or energy properties comprising at least one carrier substrate, at least one electroactive layer, at least one lower electrode, and at least one upper electrode, wherein the at least one electroactive layer is between the lower electrode and the upper electrode, wherein the lower electrode and/or the upper electrodes comprises at least one electroconductive layer comprising a metal grid that consists of a pure metal which is coated with at least one electrochemical protection layer, wherein the electrochemical protection layer is based on a material selected from group consisting of titanium, gold, platinum and palladium, said material optionally being nitrided, the electrochemical protection layer being combined with at least one barrier layer based on a metal oxide, wherein the metal oxide is selected from the group consisting of zinc oxide, zinc oxide doped with another metal selected from the family of the following metals: Al, Ga, B, and Sc, tin-doped indium oxide and antimony-doped tin oxide.

2. The electrochemical/electrically controllable device as claimed in claim 1, wherein the pure material is selected from the group consisting of silver, copper, zinc, aluminum, nickel, chromium and a nickel-chromium alloy.

3. The electrochemical/electrically controllable device as claimed in claim 1, wherein the thickness of the grid ranges from 1 to 15 μm.

4. The electrochemical/electrically controllable device as claimed in claim 1, wherein the grid has a periodic or aperiodic structure representing a light occultation of 15 to 25%.

5. The electrochemical/electrically controllable device as claimed in claim 1, wherein the thickness of the electrochemical protection layer ranges from 10 to 100 nm.

6. The electrochemical/electrically controllable device as claimed in claim 5, wherein the thickness of the electrochemical protection layer ranges from 25 to 75 nm.

7. The electrochemical/electrically controllable device as claimed in claim 1, wherein the thickness of the barrier layer ranges from 40 to 400 nm.

8. The electrochemical/electrically controllable device as claimed in claim 7, wherein the thickness of the barrier layer ranges from 60 to 300 nm.

9. The electrochemical/electrically controllable device as claimed in claim 1, wherein the grid is deposited on a second barrier layer.

10. The electrochemical/electrically controllable device as claimed in claim 1, wherein the resistivity of the electroconductive layer ranges from 0.01 ohms/☐ to 1 ohms/☐.

11. The electrochemical/electrically controllable device as claimed in claim 1, wherein the grid possesses electrical conductivity properties before and after heat treatment.

12. A method of making the device as claimed in claim 1, comprising:
    placing the electroconductive layer as an electrode of an electrochemical/electrically controllable device having variable optical and/or energy properties, or as an active layer in an electrochemical and/or electrically controllable device having variable optical and/or energy properties.

13. A glazing, comprising the device as claimed in claim 1.

14. The glazing as claimed in claim 13, wherein the glazing is an architectural glazing, a panel for equipping internal partitions, windows or roofs of a transport vehicle, a display screen, a computer screen, a television screen, a projection screen, a touch-sensitive screen, a spectacle, a camera lens, a solar panel protector, or an illuminating surface.

15. The electrochemical/electrically controllable device as claimed in claim 1, wherein the thickness of the grid ranges from 2 and 8 μm.

* * * * *